(12) United States Patent
Milosevic et al.

(10) Patent No.: US 12,244,434 B2
(45) Date of Patent: Mar. 4, 2025

(54) SYSTEM FOR EMERGENCY SAFETY WARNING AND RISK MITIGATION (71) Applicant: KONINKLIJKE PHILIPS N.V., Eindhoven (NL)

(72) Inventors: Mladen Milosevic, Stoneham, MA (US); Saman Parvaneh, Danvers, MA (US)

(73) Assignee: Koninklijke Philips N.V., Eindhoven (NL)

(*) Notice: Subject to any disclaimer, the term of this patent is extended or adjusted under 35 U.S.C. 154(b) by 1056 days.

(21) Appl. No.: 17/047,283

(22) PCT Filed: Apr. 18, 2019

(86) PCT No.: PCT/EP2019/060031
§ 371 (c)(1),
(2) Date: Oct. 13, 2020

(87) PCT Pub. No.: WO2019/202053
PCT Pub. Date: Oct. 24, 2019

(65) Prior Publication Data
US 2021/0167986 A1 Jun. 3, 2021

Related U.S. Application Data (60) Provisional application No. 62/771,846, filed on Nov. 27, 2018, provisional application No. 62/659,437, filed on Apr. 18, 2018.

(51) Int. Cl.
*H04L 12/28* (2006.01)
*G06F 16/9035* (2019.01)
(Continued)

(52) U.S. Cl.
CPC ...... *H04L 12/2838* (2013.01); *G06F 16/9035* (2019.01); *G06N 20/00* (2019.01); *H04L 12/2807* (2013.01); *H04L 67/12* (2013.01)

(58) Field of Classification Search
CPC . H04L 12/2838; H04L 12/2807; H04L 67/12; H04L 63/1425; G06F 16/9035;
(Continued)

(56) References Cited

U.S. PATENT DOCUMENTS 9,734,697 B1 8/2017 Modi
2005/0278409 A1* 12/2005 Kutzik ................... G16H 20/70
709/200
(Continued)

FOREIGN PATENT DOCUMENTS

EP 2264680 A1 * 12/2010 ............. G01D 4/002
WO WO-2020096969 A1 * 5/2020

OTHER PUBLICATIONS

International Search Report and Written Opinion, International Application No. PCT/EP2019/060031, Mailed on Sep. 9, 2019.
(Continued)

*Primary Examiner* — James J Yang (57) ABSTRACT

Various embodiments relate to a system for activities of daily living ("ADL") and instrumental activities of daily living ("IADL") monitoring through electric current profile sensing, the system including an electric current profile sensing module configured to sense electricity usage and capture a current profile of a plurality of devices in a home using a plurality of current clamps, a device usage detection module configured to match the current profile for each of the plurality of devices to a referenced profile for each of the plurality of devices to determine a detected usage for each of the plurality of devices and an ADL and IADL module configured to translate the detected usage for each of the plurality of devices into ADLs and IADLs; wherein the ADL and IADL detection module determines whether a detected usage is a hazardous situation based on ADLs and IADLs.

11 Claims, 5 Drawing Sheets (51) Int. Cl.
G06N 20/00 (2019.01)
H04L 67/12 (2022.01)

(58) Field of Classification Search
CPC ........ G06N 20/00; G06N 3/044; G06N 3/084; H04W 4/38; H04W 4/90
See application file for complete search history.

(56) References Cited

U.S. PATENT DOCUMENTS

| | | |
|---|---|---|
| 2006/0261962 A1 | 11/2006 | Berenguer |
| 2014/0201315 A1 | 7/2014 | Jacob et al. |
| 2015/0161020 A1 | 6/2015 | Matsuoka et al. |
| 2016/0371969 A1 | 12/2016 | Rossi et al. |
| 2017/0365149 A1 | 12/2017 | Ten Kate |
| 2019/0181641 A1* | 6/2019 | de Hoog ........... H02J 13/00017 |

OTHER PUBLICATIONS

Chen, C. et al., "Energy Prediction Based on Resident's Activity", SensorKDD'10, Jul. 25, 2010, Washington, DC, USA.

Yang, C. et al., "Remote monitoring and assessment of daily activities in the home environment", Journal of Clinical Gerontology & Geriatrics 3 (2012) 97-104.

K. M. Daniel, C. L. Cason, and S. Ferrell, "Emerging technologies to enhance the safety of older people in their homes," Geriatr. Nurs. N. Y. N, vol. 30, No. 6, pp. 384-389, Dec. 2009.

"Injury Facts: The Source for Injury Stats", https://www.nsc.org/membership/member-resources/injury-facts, Accessed Oct. 9, 2020.

"Fire Risk in 2015," U.S. Department of Homeland Security, U.S. Fire Administration, vol. 18, Issue 6, Sep. 2017.

D. M. Oleske, R. S. Wilson, B. A. Bernard, D. A. Evans, and E. W. Terman, "Epidemiology of injury in people with Alzheimer's disease," J. Am. Geriatr. Soc., vol. 43, No. 7, pp. 741-746, Jul. 1995.

"Automatic meter reading", Wikipedia, https://en.wikipedia.org/wiki/Automatic_meter_reading, Accessed Oct. 9, 2020.

N. US Department of Commerce, "National Weather Service." [Online]. Available: http://www.weather.gov/, Accessed Oct. 9, 2020.

"National Oceanic and Atmospheric Administration." [Online]. Available: http://www.noaa.gov/, Accessed Oct. 9, 2020.

"2017 Distressed Communities Index," Economic Innovation Group, eig.org/DCindex, 2017.

"SOI Tax Stats Individual Income Tax Statistics 2013 ZIP Code Data SOI | Internal Revenue Service." [Online]. Available: https://www.irs.gov/statistics/soi-tax-stats-individual-income-tax-statistics-2013-zip-code-data-soi, Accessed Oct. 9, 2020.

"Exploring the County Health Rankings Data," County Health Rankings & Roadmaps. [Online]. Available: http://www.countyhealthrankings.org/explore-health-rankings/use-data/exploring-data, Accessed Oct. 9, 2020.

* cited by examiner

SYSTEM FOR EMERGENCY SAFETY WARNING AND RISK MITIGATION

CROSS-REFERENCE TO PRIOR APPLICATIONS

This application is the U.S. National Phase application under 35 U.S.C. § 371 of International Application No. PCT/EP2019/060031, filed on 18 Apr. 2019, which claims the benefit of U.S. Provisional Patent Application No. 62/659,434, filed on 18 Apr. 2018 and U.S. Provisional Patent Application No. 62/771,846, filed on 27 Nov. 2018. These applications are hereby incorporated by reference herein.

TECHNICAL FIELD

This disclosure relates generally to emergency safety warning, and more specifically, but not exclusively, to monitoring safety hazards and mitigating the risk of those safety hazards.

BACKGROUND

In the United States alone, there were approximately 42.6 million adults age 65 or order in 2014 and that approximate figure is expected to double by the year 2060 to approximately 98 million. According to the American Association of Retired Persons ("AARP"), approximately 90% of adults 65 or older would prefer to age in their homes, which is creating a need for technological solutions that can safely facilitate aging in their homes.

Ensuring the safety of senior adults protects their independence and quality of life. According to the National Safety Council, in 2016, accidental injuries have become the number three cause of deaths for the first time in U.S. history, which is an increase of 10% from the previous year. Fire is one of the leading cause of accidental death over all ages. Cooking, including forgetting to turn the stove or other appliance off is the leading cause of residential fires which resulted in injuries in 2015.

The risk of individuals age 65 or over dying in a fire is almost three times greater than for the general population, and the risk worsens as age increases. In 2015, adults age 65 or older accounted for 40 percent of all fire deaths, although the same population constituted only 15 percent of the U.S. population at the time. Further, individuals with cognitive impairment are at even greater risk of accidental injury, including fire.

SUMMARY

A brief summary of various embodiments is presented below. Embodiments address a system for emergency safety warning and risk mitigation.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments described herein relate to a system for activities of daily living ("ADL") and instrumental activities of daily living ("IADL") monitoring through electric current profile sensing, the system including an electric current profile sensing module configured to sense electricity usage and capture a current profile of a plurality of devices in a home using a plurality of current clamps, a device usage detection module configured to match the current profile for each of the plurality of devices to a referenced profile for each of the plurality of devices to determine a detected usage for each of the plurality of devices; and an ADL and IADL module configured to translate the detected usage for each of the plurality of devices into ADLs and IADLs wherein the ADL and IADL detection module determines whether a detected usage is a hazardous situation based on ADLs and IADLs.

In an embodiment of the present disclosure, the system for ADL and IADL monitoring through electric current profile sensing, the system further including a device current profile database configured to store the referenced profile for each of the plurality of devices, wherein the device current profile database is populated from external sources and a calibration and learning module.

In an embodiment of the present disclosure, the system for ADL and IADL monitoring through electric current profile sensing, the system further including a device usage database configured to store the detected usage for each of the plurality of devices.

In an embodiment of the present disclosure, the system for ADL and IADL monitoring through electric current profile sensing, the system further including an ADL and IADL recognition model configured to store rules or machine learning algorithms for detecting an ADL, an IADL or a hazardous situation, wherein the ADL and IADL recognition model is populated by external sources and a calibration and learning module.

In an embodiment of the present disclosure, the system for ADL and IADL monitoring through electric current profile sensing, the system further including an ADL and IADL database configured to store the ADLs, IADLs, and the hazardous situations.

In an embodiment of the present disclosure, the system for ADL and IADL monitoring through electric current profile sensing, the system further including a communication user interface configured to transmit ADLs, IADLs, and hazardous situations to stakeholders.

In an embodiment of the present disclosure, the system for ADL and IADL monitoring through electric current profile sensing, the system further including a calibration and learning module configured to learn the current profile for each of the plurality of devices and map each of the plurality of device activations to ADLs, IADLs, and hazardous situations.

In an embodiment of the present disclosure, the plurality of current clamps perform the current sensing for each of the plurality of devices, using non-contact alternating current measurements, on a single input electrical power line before a circuit breaker.

In an embodiment of the present disclosure, the plurality of current clamps perform the current sensing for each of the plurality of devices, using non-contact alternating current measurements, on a plurality of electric power lines exiting a circuit breaker.

In an embodiment of the present disclosure, a current transformer inside each of the plurality of current clamps senses magnetic fluctuations and converts the magnetic fluctuations value into an alternating current reading and the electric current profile sensing module performs high-frequency sampling to capture the current profile for each of the plurality of devices.

Various embodiments described herein relate to a system for in-home safety monitoring and risk mitigation, the system including a home sensing module configured to collect readings from a plurality of utility meters in a home, an external factors module configured to collect a plurality of contextual factors from the home, a risk assessment and analysis module configured to detect a hazardous situation by analyzing data from the plurality of utility meters and the plurality of contextual factors and a safety prompts module configured to send to a user a prompt about the hazardous situation when a hazardous situation has been detected.

In an embodiment of the present disclosure, the system for in-home safety monitoring and risk mitigation, the system further including a safety warning notification and reports module configured to transmit the prompt about the hazardous situation to a predefined safety network.

In an embodiment of the present disclosure, the home sensing module uses a software defined radio to listen for radio packages from the plurality of utility meters.

In an embodiment of the present disclosure, contextual factors include weather, temperature, wind, wind chill, humidity, atmospheric pressure, size of home, and socio-economic factors.

In an embodiment of the present disclosure, the home sensing module uses a camera to monitor readings of the plurality of utility meters and process images on the home sending module.

In an embodiment of the present disclosure, the risk assessment and analysis module uses semi-supervised machine learning algorithms to detect an anomaly in data from the plurality of utility meters and the plurality of contextual factors.

In an embodiment of the present disclosure, the risk assessment and analysis module uses unsupervised machine learning algorithms to detect an anomaly in data from the plurality of utility meters and the plurality of contextual factors.

In an embodiment of the present disclosure, the safety prompts module uses a response to the prompt from a user to improve future hazardous situation detections.

In an embodiment of the present disclosure, the home sensing module uses external data to reduce false positives of hazardous situations.

In an embodiment of the present disclosure, the safety warning notification and reports module transmits periodic reports to stakeholders.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims and explain various principles and advantages of those embodiments.

These and other more detailed and specific features are more fully disclosed in the following specification, reference being had to the accompanying drawings, in which.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

This disclosure addresses the need for a system for emergency safety warning and risk mitigation.

In an embodiment, the system uses existing utility monitors, combined with external factors and the safety network of family and friends to identify potential safety hazards and to mitigate the risk of those hazards.

Many technological systems are available to detect various activities of daily living (ADLs) and instrumental activities of daily living (IADLs), to detect and identify early sings of health decline and/or hazardous situations.

In order to sense elder adult's activities in the house, most of those systems rely on multiple sensors strategically placed throughout various places in the elder adult's home, which is very complex and difficult for various reasons including differences in the layout of people's houses may be different, and a universal approach in sensor installation is difficult and installing multiple sensors in homes (for example, on appliance power meters, water leaks, etc.) is not efficient and may be concerning for elder adults, especially in case of elder audits with cognitive challenges. Further, having a number of wireless sensor, especially battery operated sensors, in a house working consistently and for a prolong period of time is challenging for the elder adult and their caregiver.

In another embodiment, the system simplifies ADL and IADL monitoring by utilizing for example, electricity usage, water usage or gas usage as a proxy for elder person's activity in the house.

In the embodiment, the system overcomes the issues of monitoring by using existing utility monitors, combined with external factors and a safety network of family and friends to identify potential safety hazards and to mitigate the risk of those hazards.

The embodiment is directed towards a system and method for an unobtrusive plug-and-play in home safety monitoring and risk mitigation by using existing utility monitors (e.g., electricity and water meters), combined with external factors and safety network of family and friends. The system in the embodiment does not require a number of wireless sensor spread-out around the house and is not noticeable to the elderly adults that are living in the house.

Figure 1:
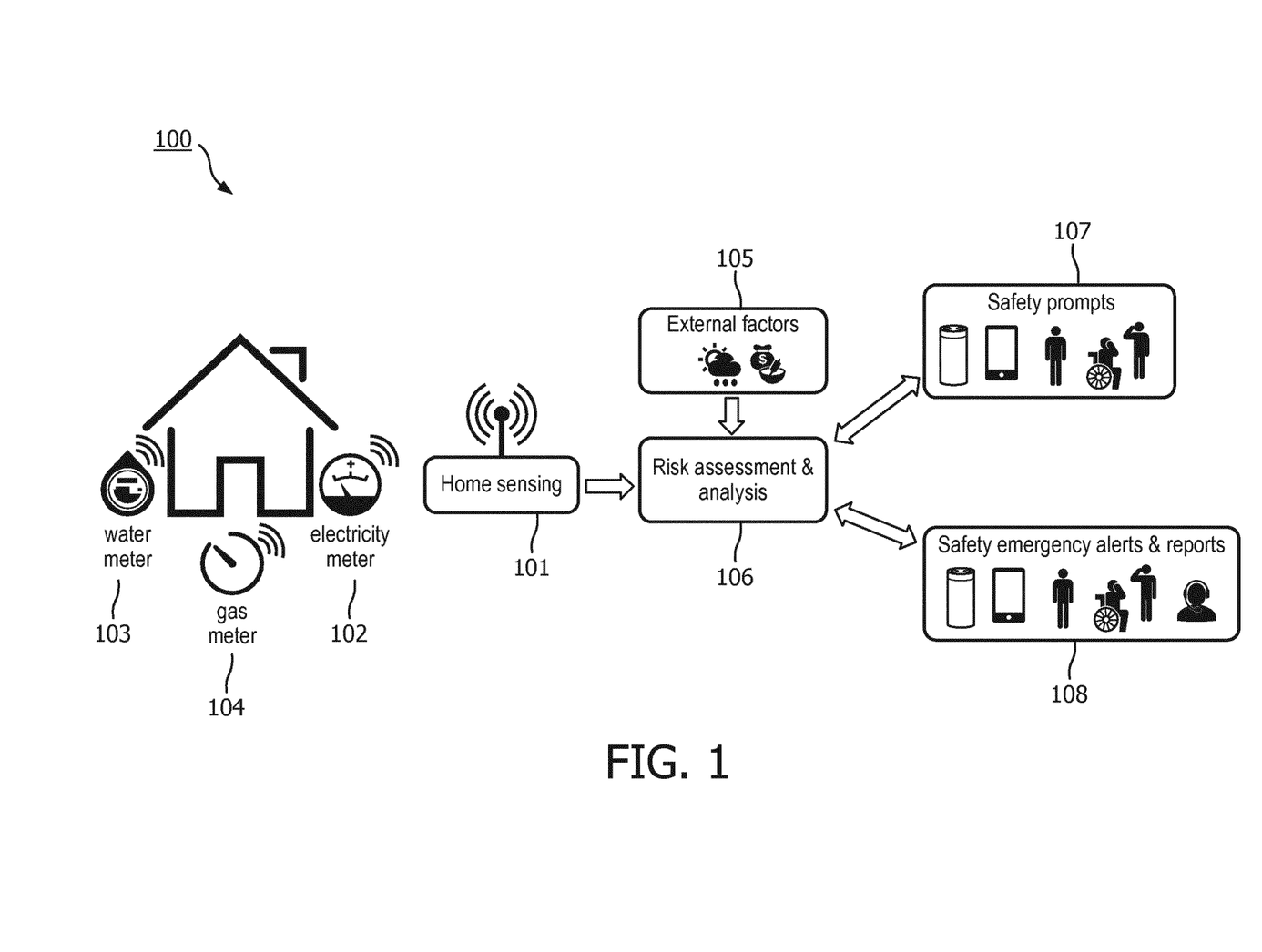
FIG. 1 illustrates a system for an unobstructed plug-and-play in-home safety monitoring and risk mitigation system of a current embodiment.

FIG. 1 illustrates a system 100 for an unobstructed plug-and-play in-home safety monitoring and risk mitigation system of a current embodiment.

The system 100 includes a home sensing module 101 which collects information from existing utility meters such as an electricity meter 102, a water meter 103, and a gas meter 104.

Since most of the utility meters are equipped with automatic meter reading ("AMR") capabilities which are for automatically collecting consumption on the meters, the home sensing module 101 may listen for radio packages that the utility meters emit using a software defined radio ("SDR").

If the utility meters are not equipped with radio transmitters, the home sensing module 101 may use a camera to monitor the readings of the utility meters. The camera would capture an image of the utility meter on regular basis and analyze the data locally and transfer the results to the home sensing module 101 and/or process the images on the home sensing module 101. Local processing of the images may be used when there is a disconnection between the utility meter and the home sensing module 101.

The system 100 may include an external factors module 105 which may collect information about contextual factors, for example, weather, temperature, wind, wind chill, humidity, atmospheric pressure, size of home, socioeconomics from publicly available data. The dynamic data (e.g., weather, temperature, etc.) may be collected in near real-time from the National Weather Service, for example, provided by the National Oceanic and Atmospheric Administration. Non-dynamic data may be collected from other publicly available sources. External data may be used to understand a context of utility usage and help reduce possible false positives.

The system 100 may include a risk assessment and analysis module 106 which may analyze the data collected by the home sensing module 101 and the external factors module 105 and detect potentially hazardous situations. The system 100 may utilize machine learning algorithms for detecting anomalies in combination of the utility usage from the utility meters and contextual information from the external factors module 105.

The monitoring may be implemented using semi-supervised and unsupervised anomaly detection algorithms, similar to one used in network intrusion and fraud detection, or data leakage prevention. The algorithm will detect anomalies that might represent potential hazardous situation, for example, increased risk of fire due to stove being left in an on position or electrical malfunction, or risk of in-home flooding due to faucet being left in an open position or a leaking pipe. Once a potential safety hazard is detected, the system 100 may activate a safety prompts module 107.

Another algorithm may be used which is a machine learning algorithm for detection of a potential hazardous situation which may be a recurrent neural network (e.g., 2-layer LSTM, with 32 units per layer) and a quantile regression loss function may be applied, and the model may be trained by an Adam algorithm, using truncated back-propagation on randomly drawn 2-week segments of data.

The system 100 may include a safety prompts module 107 which may deliver prompts to a user and subsequently to individuals (or organizations) in a user's safety network. These prompts may be delivered using an optimized user interface (e.g., touch and/or voice) using a smartphone application and/or smart home assistant (e.g., Amazon Alexa or Google Home).

The prompts transmitted from the safety prompts module 107 may be first delivered to the user informing the user about the detected situation and reminding the user about safe practices, and the prompt may state: "The system detected a higher than normal electricity usage in the last 30 min and would like to make sure you stay safe and don't forget to turn off the stove and/or heater."

The user may respond by selecting one of the predefined options, for example, "I am aware and there is no danger", "I will turn it off", "False Alarm" or by speaking to the voice assistant. The responses may be forwarded back to the risk assessment and analysis module 106.

When the system 100 does not receive a response in a certain period of time, a similar prompt may be sent to his safety network. After either a response is received and forwarded to the risk assessment and analysis module 106, or in the case of no response being received, a safety emergency alerts module 108 may be activated. The risk assessment and analysis module 106 may use each response to adjust the prediction models and improve future detections, allowing the system 100 to become more personalized and more accurate over time.

The system 100 may include a safety warning notifications and reports module 108 which may provide the user an opportunity to cancel the warning in certain period after which, if not canceled, the alerts may be sent to the pre-defined safety network. In addition, the safety warning notification and reports module 108 may allow periodical reporting to relevant stakeholders (e.g., family members and/or emergency services).

Figure 2:
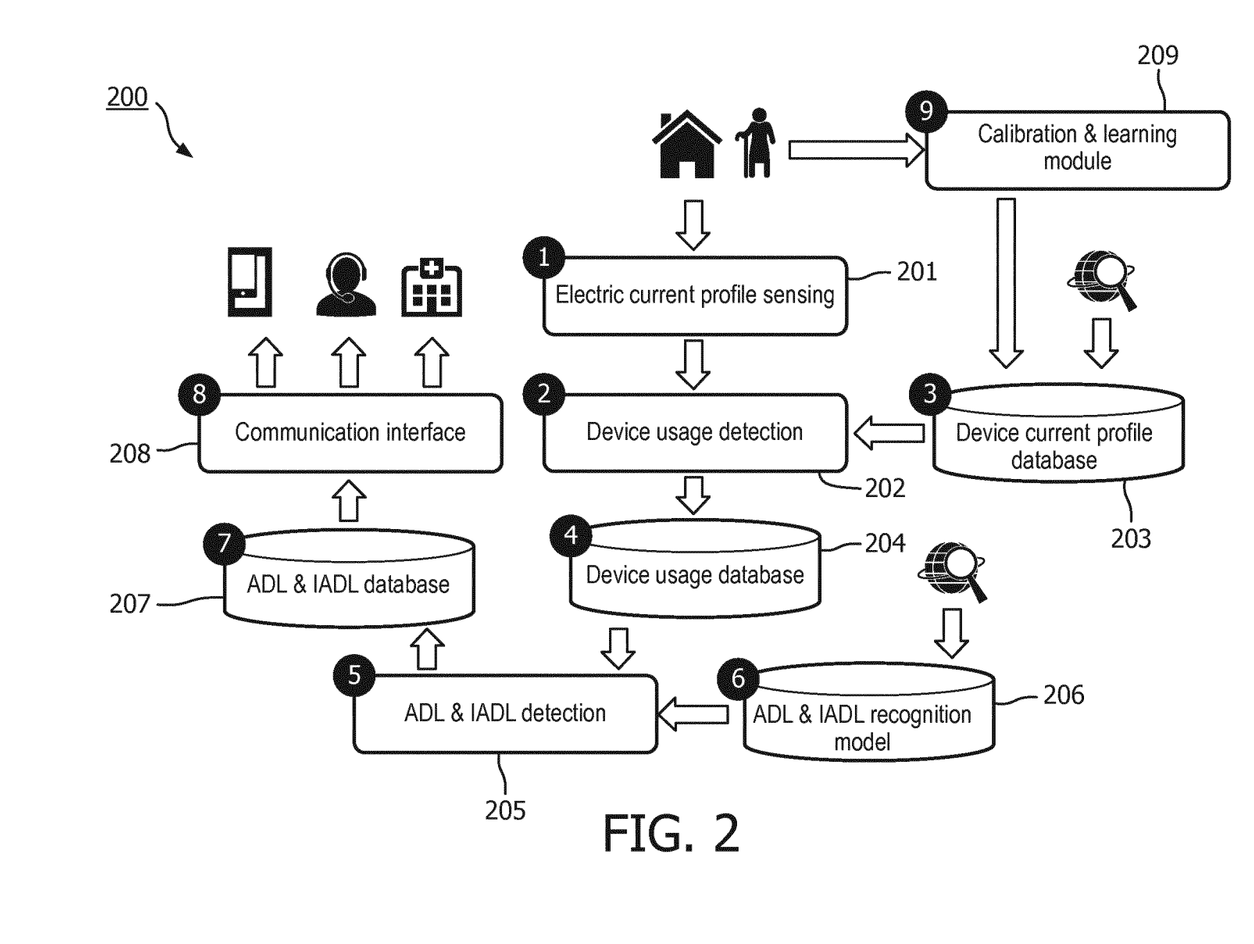
FIG. 2 illustrates a system for an ADL and IADL monitoring and emergency situation warning through electric current profile sensing of an alternative embodiment.

FIG. 2 illustrates a system 200 for an ADL and IADL monitoring and emergency situation warning through electric current profile sensing of an alternative embodiment.

ADL and IADL monitoring systems rely on multiple sensors strategically placed in the elder adult's home, which is difficult because the layout of homes are different and it is there may not be a universal approach in sensor installation, having multiple wireless sensors in a home working consistently and for prolong period of time may be difficult and installing sensors on walls and appliances is difficult.

The system 200 uses centralized unobstructed electricity usage monitoring through one or more electrical current clamps.

The system 200 includes an electric current profile sensing module 201 which may sense electricity usage of the devices in a home through the current clamps. The sensing may be performed by the circuit breakers, either on a single input electrical power line before the circuit breaker that brings electricity to the home or on multiple electrical power line exiting the circuit breaker.

Figure 3:
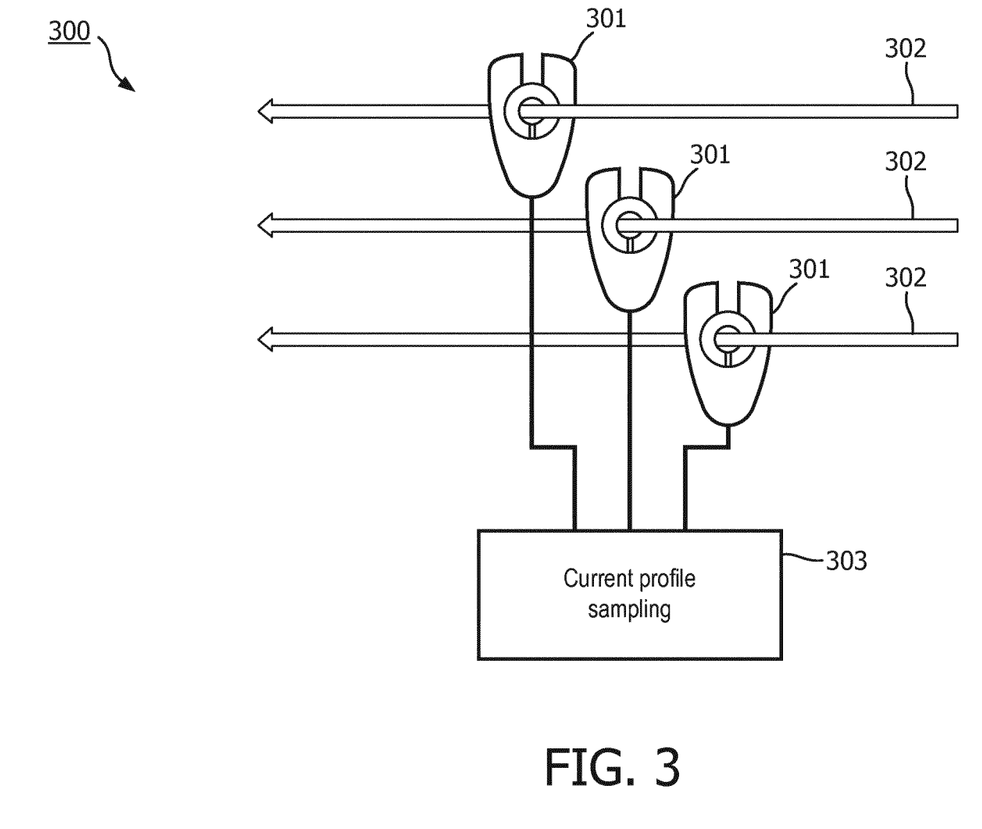
FIG. 3 illustrates current profile sensing of the alternative embodiment.

FIG. 3 illustrates current profile sensing 300 of the alternative embodiment.

The clamp meters 301 may perform non-contact alternating current ("AC") measurements using magnetic induction. The electric current flowing through a wire 302 produces a magnetic field and causes dynamic fluctuations in the magnetic field which are proportional to the current flow. A current transformer inside the clamp meter may sense the magnetic fluctuations and convert the value to an AC current reading.

The electric current profile sampling module 303 may perform high-frequency sampling to capture a detailed current profile which may be used by a device usage detection module 202.

Figure 4:
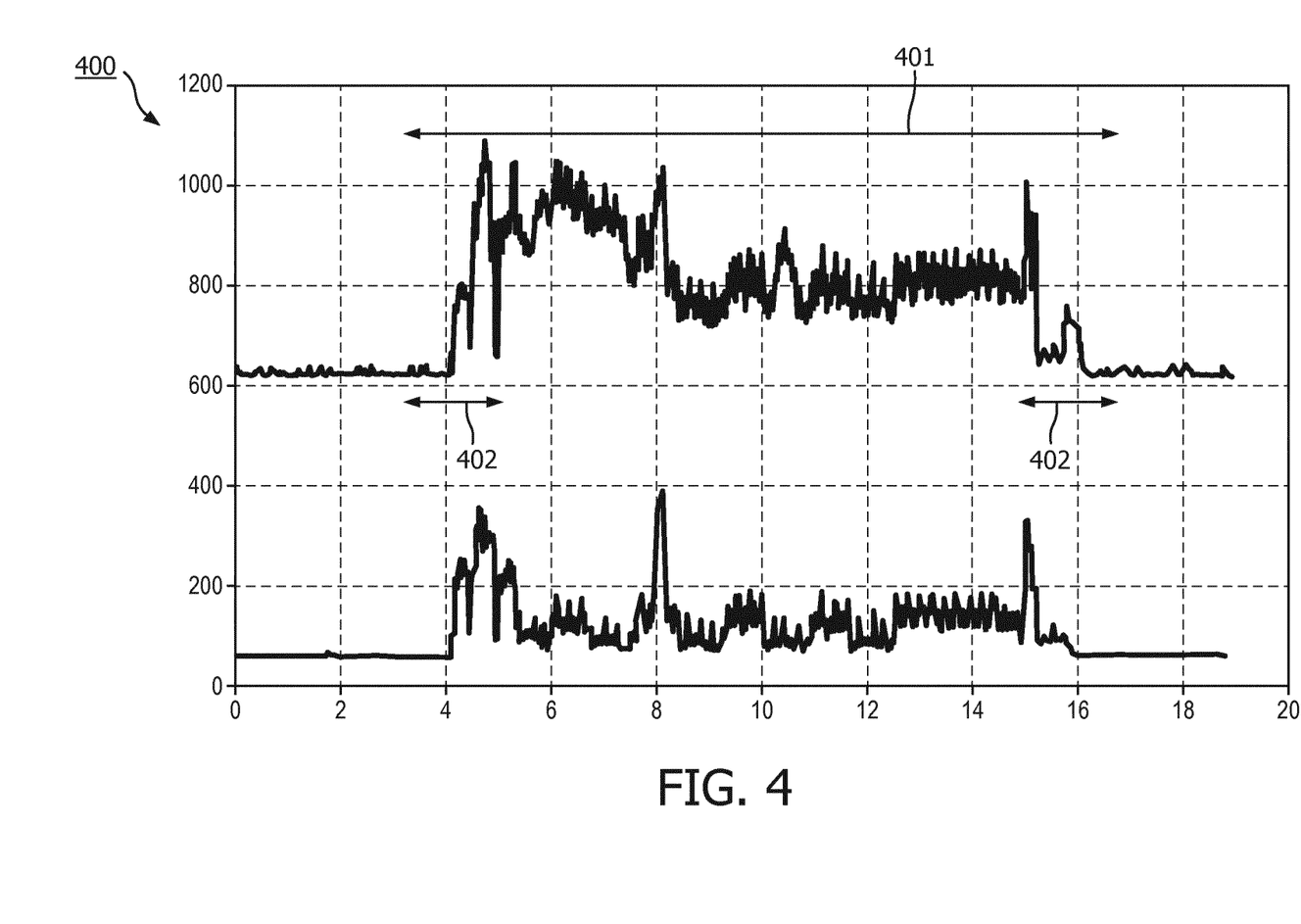
FIG. 4 illustrates a graph of a current profile of the alternative embodiment.

FIG. 4 illustrates a graph 400 of a current profile of the alternative embodiment.

FIG. 4 is a graph of the current over a period of time for a device in a home.

The system 200 may include a device usage detection module 202 which may receive the electric current profile captured by the electric current profile sensing module 201 and determine which device in the home is currently active or was just activated. The device usage detection module 202 may use a device current profile database 203 to match the sensed current profile 401 with referenced profiles in the device current profile database 203.

Since certain devices in the system 200 may operate for a prolonged period of time and detection may be focused on the transition periods 402 only.

The system 200 may include a device current profile database 203 which may store reference current profiles or a type of representation of current profiles that may be used for device usage detection for all known device types in a home. The device current profile database 203 may be populated from an external source and/or from a calibration and learning module 209.

The system 200 may include a device usage database 204 which may store all detected usages of devices in a home, which is used to translate the usage of home devices to ADLs, IADLs, and/or other potential hazardous situations.

The system 200 may include an ADL and IADL detection module 205 which may translate the detected device usage from the device usage database 204 to ADLs and IADLs using models from the ADL and IADL recognition model database 206. The recognition may be performed using a rule-based approach, for example, using an electric kettle for a certain period of time may mean preparing and drinking tea or coffee. Similarly, for example, usage of an oven for a certain period of time may mean preparing a meal.

These rules may be used for detection and warning of potentially hazardous situations in the home. For example, prolonged usage of a stove, oven, or other heating elements may indicate a hazardous situation.

The ADL and IADL detection module 206 may use a machine learning approach for detections, including neural networks.

The system 200 may include an ADL and IADL recognition model database 206 which may store reference models for detection performed by the ADL and IADL detection module 205. The models may be in the form of a set of rules, or any other format needed for detection (e.g., a neural network structure and weight). The ADL and IADL recognition module database 206 may be populated from external sources and/or from the calibration and learning module 209.

The system 200 may include an ADL and IADL database 207 which may store all detected ADLs, IADLs and hazardous situation which may be delivered to various stakeholders or used for further processing.

The system 200 may include a communication user interface module 208 which may deliver information to all relevant stakeholders, for example, users, informal or formal caregivers or any other stakeholder.

The system may include a calibration and learning module 209 which may be used to learn current profiles for the devices in the home and/or for "mapping" of device activations to ADLs, IADLs and potential hazardous situations.

Figure 5:
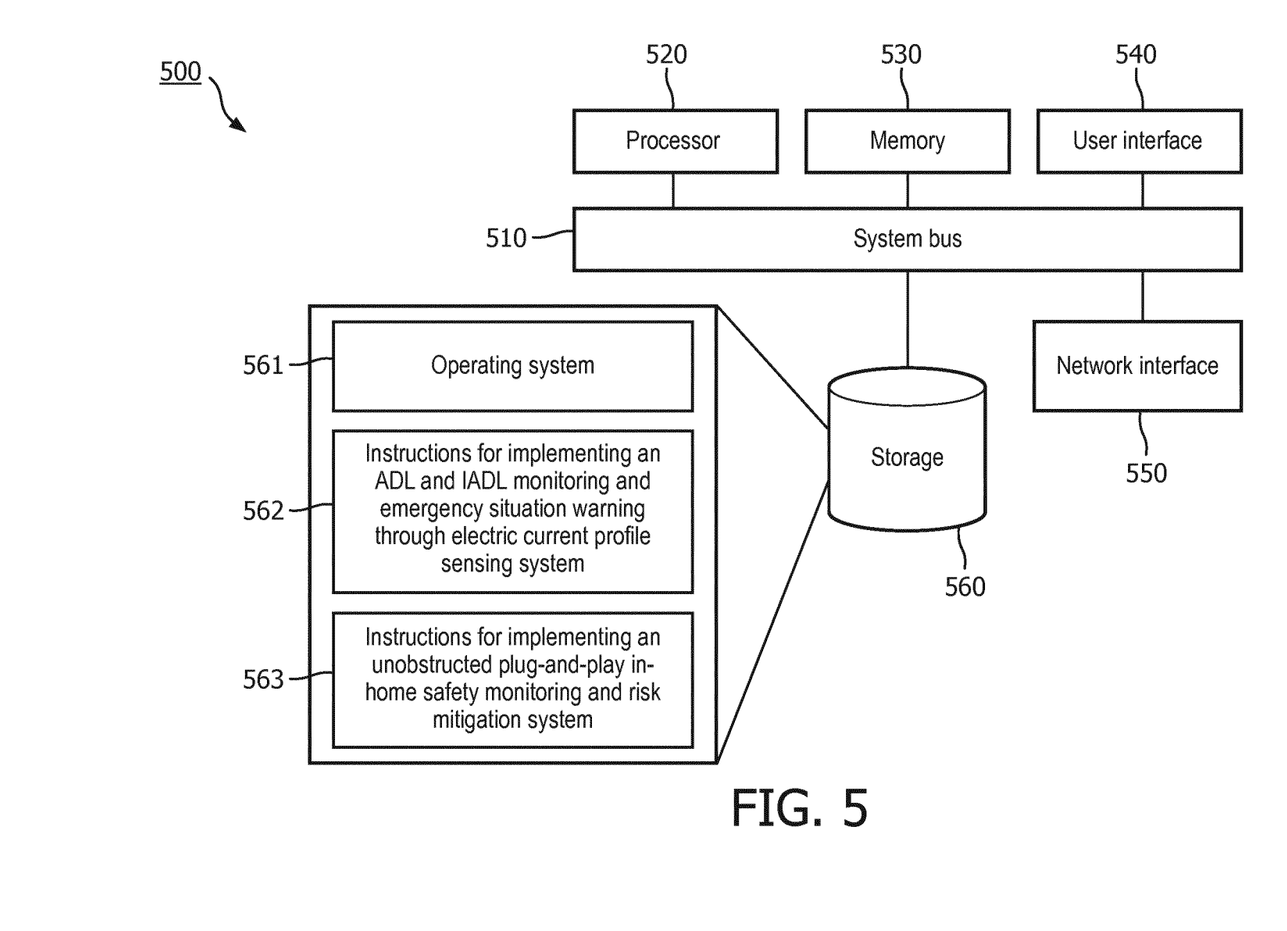
FIG. 5 illustrates a block diagram of a real-time data processing system of the embodiments.

FIG. 5 illustrates an exemplary hardware diagram 500 for implementing a method for emergency safety warning and risk mitigation. As shown, the device 500 includes a processor 520, memory 530, user interface 540, network interface 550, and storage 560 interconnected via one or more system buses 510. It will be understood that FIG. 5 constitutes, in some respects, an abstraction and that the actual organization of the components of the device 500 may be more complex than illustrated.

The processor 520 may be any hardware device capable of executing instructions stored in memory 530 or storage 560 or otherwise processing data. As such, the processor may include a microprocessor, field programmable gate array (FPGA), application-specific integrated circuit (ASIC), or other similar devices.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for enabling communication with a user such as an administrator. For example, the user interface 540 may include a display, a mouse, and a keyboard for receiving user commands. In some embodiments, the user interface 540 may include a command line interface or graphical user interface that may be presented to a remote terminal via the network interface 550.

The network interface 550 may include one or more devices for enabling communication with other hardware devices. For example, the network interface 550 may include a network interface card (NIC) configured to communicate according to the Ethernet protocol. Additionally, the network interface 550 may implement a TCP/IP stack for communication according to the TCP/IP protocols. Various alternative or additional hardware or configurations for the network interface 550 will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon with the processor 520 may operate. For example, the storage 560 may store a base operating system 561 for controlling various basic operations of the hardware 500 and instructions for ADL and IADL monitoring and emergency situation warning through electric current profile sensing 562 and instructions for an unobstructed plug-and-play in-home safety monitoring and risk mitigation system 563.

It will be apparent that various information described as stored in the storage 560 may be additionally or alternatively stored in the memory 530. In this respect, the memory 530 may also be considered to constitute a "storage device" and the storage 560 may be considered a "memory." Various other arrangements will be apparent. Further, the memory 530 and storage 560 may both be considered "non-transitory machine-readable media." As used herein, the term "non-transitory" will be understood to exclude transitory signals but to include all forms of storage, including both volatile and non-volatile memories.

While the host device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for activities of daily living ("ADL") and instrumental activities of daily living ("IADL") monitoring through electric current profile sensing, the system comprising:
   a home sensing module configured to collecting information from an existing utility meter, wherein the existing utility meter includes at least a water meter;
   an electric current profile sensing module configured to sense electricity usage and capture an electrical current profile of a plurality of devices in a home using a plurality of current clamps;
   a device usage detection module configured to match the electrical current profile for each of the plurality of devices to a referenced profile for each of the plurality of devices to determine a detected usage for each of the plurality of devices;
   an external factors module configured to collect information about contextual factors associated with the home from publicly available data, wherein the collected information includes at least one of a size of the home, and/or socioeconomic information; and
   an ADL and IADL detection module configured to translate the detected usage for each of the plurality of devices into ADLs and IADLs;
   a risk assessment and analysis module configured analyze the information provided by the home sensing module, the external factors module, and/or the ADL and IADL detection module to detect a hazardous situation, wherein the hazardous situation is a risk of a fire determined based on the detected usage for each of the plurality of devices and/or the hazardous situation is a risk of in-home flooding determined based on the information collected from the existing utility meter, wherein the hazardous situation is further determined based on the information collected by the external factors module; and
   a safety prompts module configured to deliver a first prompt to a user about the detected hazardous situation, wherein the safety prompts module is further configured to deliver a second prompt to one or more individuals or organizations in a safety network of the user if the user does not respond to the first prompt with a certain period of time.

2. The system for ADL and IADL monitoring through electric current profile sensing of claim 1, the system further comprising:
   a device current profile database configured to store the referenced profile for each of the plurality of devices, wherein the device current profile database is populated from external sources and a calibration and learning module.

3. The system for ADL and IADL monitoring through electric current profile sensing of claim 1, the system further comprising:
a device usage database configured to store the detected usage for each of the plurality of devices.

4. The system for ADL and IADL monitoring through electric current profile sensing of claim 1, the system further comprising:
an ADL and IADL recognition model configured to store rules or machine learning algorithms for detecting an ADL, an IADL or a hazardous situation, wherein the ADL and IADL recognition model is populated by external sources and a calibration and learning module.

5. The system for ADL and IADL monitoring through electric current profile sensing of claim 1, the system further comprising:
an ADL and IADL database configured to store the ADLs, IADLs, and the hazardous situation.

6. The system for ADL and IADL monitoring through electric current profile sensing of claim 1, the system further comprising:
a communication user interface configured to transmit ADLs, IADLs, and hazardous situations to stakeholders.

7. The system for ADL and IADL monitoring through electric current profile sensing of claim 1, the system further comprising:
a calibration and learning module configured to learn the current profile for each of the plurality of devices and map each of the plurality of device activations to ADLs, IADLs, and hazardous situations.

8. The system for ADL and IADL monitoring through electric current profile sensing of claim 1, wherein the plurality of current clamps perform the current sensing for each of the plurality of devices, using non-contact alternating current measurements, on a single input electrical power line before a circuit breaker.

9. The system for ADL and IADL monitoring through electric current profile sensing of claim 1, wherein the plurality of current clamps perform the current sensing for each of the plurality of devices, using non-contact alternating current measurements, on a plurality of electric power lines exiting a circuit breaker.

10. The system for ADL and IADL monitoring through electric current profile sensing of claim 1, wherein a current transformer inside each of the plurality of current clamps senses magnetic fluctuations and converts the magnetic fluctuations value into an alternating current reading and the electric current profile sensing module performs high frequency sampling to capture the current profile for each of the plurality of devices.

11. A system for activities of daily living ("ADL") and instrumental activities of daily living ("IADL") monitoring through electric current profile sensing, the system comprising:
a home sensing module configured to collecting information from an existing utility meter, wherein the existing utility meter includes at least a water meter;
an electric current profile sensing module configured to sense electricity usage and capture an electrical current profile of a plurality of devices in a home using a plurality of current clamps;
a device usage detection module configured to match the electrical current profile for each of the plurality of devices to a referenced profile for each of the plurality of devices to determine a detected usage for each of the plurality of devices;
an external factors module configured to collect information about contextual factors associated with the home from publicly available data, wherein the collected information includes at least one of a size of the home, and/or socioeconomic information;
an ADL and IADL detection module configured to translate the detected usage for each of the plurality of devices into ADLs and IADLs;
a risk assessment and analysis module configured analyze the information provided by the home sensing module, the external factors module, and/or the ADL and IADL detection module to detect a hazardous situation, wherein the hazardous situation is a risk of a fire determined based on the detected usage for each of the plurality of devices and/or the hazardous situation is a risk of in-home flooding determined based on the information collected from the existing utility meter, wherein the hazardous situation is further determined based on the information collected by the external factors module and a length of time the detected usage occurs over; and
a safety prompts module configured to deliver a first prompt to a user about the detected hazardous situation, wherein the safety prompts module is further configured to deliver a second prompt to one or more individuals or organizations in a safety network of the user if the user does not respond to the first prompt with a certain period of time.

* * * * *